United States Patent
Liu

(10) Patent No.: US 8,457,600 B2
(45) Date of Patent: Jun. 4, 2013

(54) ELECTRONIC DEVICE AND METHOD FOR VALIDATING CONTACT IDENTIFICATION

(75) Inventor: Chun-Lung Liu, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/313,003

(22) Filed: Dec. 7, 2011

(65) Prior Publication Data

US 2012/0220265 A1 Aug. 30, 2012

(30) Foreign Application Priority Data

Feb. 25, 2011 (TW) .............................. 100106566 A

(51) Int. Cl.
*H04M 3/16* (2006.01)
*H04M 3/42* (2006.01)

(52) U.S. Cl.
USPC ........... 455/411; 455/410; 455/415; 455/418; 379/88.02

(58) Field of Classification Search
None
See application file for complete search history.

(56) References Cited

U.S. PATENT DOCUMENTS

| 8,135,119 B1 * | 3/2012 | Zhao et al. ............... 379/142.05 |
| 2008/0137828 A1 * | 6/2008 | Chmaytelli .............. 379/142.01 |
| 2010/0074420 A1 * | 3/2010 | Bauchot et al. ............ 379/88.02 |

* cited by examiner

*Primary Examiner* — Erika A Washington
(74) *Attorney, Agent, or Firm* — Altis Law Group, Inc.

(57) ABSTRACT

An electronic device sets an identifier for each contact stored in a phone book, automatically creates a short message which contains the identifier according to a preset message template, and sends the short message to a phone number of the contact to inform the contact of the identifier. In response to receiving a call from a contact, the device prompts the contact to input an identifier, and detects if one or more push-button signals have been received from the contact by a dual-tone multi-frequency (DTMF) decoder. If no push-button signal has been received, the device determines the contact fails validation. Otherwise, the DTMF decoder decodes the received one or more push-button signals to determine data information input by the contact, and then the device determines if the contact passes the validation by determining the data information matches an identifier of the contact that is stored in the phone book.

12 Claims, 6 Drawing Sheets

Hi, *! Your identifier is ** in my mobile phone, please note! — 22

FIG. 4

|  | Tone B [Hz] | | | |
|---|---|---|---|---|
|  |  | 1209 | 1336 | 1477 | 1633 |
| Tone A [Hz] | 697 | 1 | 2 | 3 | A |
|  | 770 | 4 | 5 | 6 | B |
|  | 852 | 7 | 8 | 9 | C |
|  | 941 | * | 0 | # | D |

FIG. 6

ELECTRONIC DEVICE AND METHOD FOR VALIDATING CONTACT IDENTIFICATION

BACKGROUND

1. Technical Field

The embodiments of the present disclosure relate to user identification validating systems and methods, and particularly to an electronic device and a method for validating contact identification.

2. Description of Related Art

Caller identification (caller ID) is a popular telephone feature that displays a caller's telephone number on a display of a recipient's telephone during a ringing signal stage of a phone call. Caller ID also displays a name associated with the caller's telephone number according to associations set in a phone book of the recipient's phone. However, the telephone number may be faked. For example, caller ID spoofing is a method in which a person can cause a telephone network to display a number on the recipient's caller ID display which is not the number of the originating caller, which may be used to describe deceptive situations in which the caller has nefarious motives. Since caller ID spoofing can make a phone call look like it is coming from any phone number the caller wants and because people usually assume a call is actually coming from the number being displayed (and therefore, the associated person, persons, or organization), all kinds of actions (both legal and illegal) can be done with such a manipulative ability.

BRIEF DESCRIPTION OF THE DRAWINGS

FIG. 4 is one embodiment that illustrates a short message automatically created by the contact identification validation system shown in FIG. 1.

FIG. 6 is one embodiment that illustrates a table of dual-tone multi-frequencies (DTMF).

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
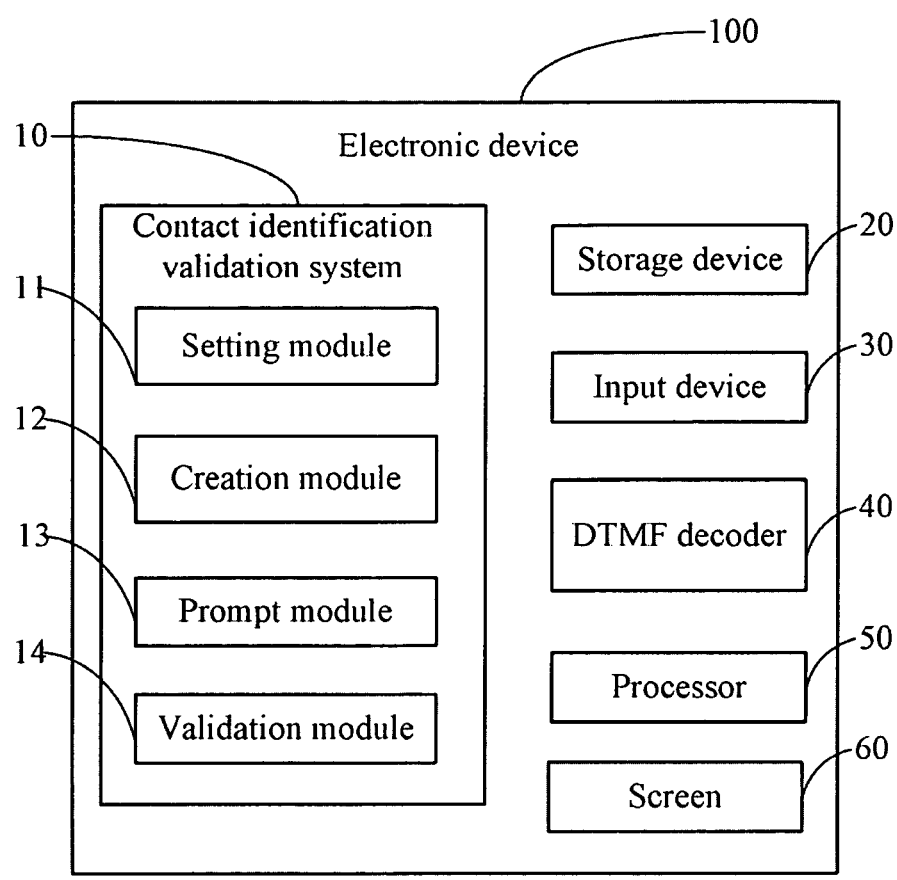
FIG. 1 is a block diagram of one embodiment of function modules of an electronic device comprising a contact identification validation system.

FIG. 1 is a block diagram of one embodiment of function modules of an electronic device 100. In one embodiment, the electronic device 100 includes a contact identification validation system 10, a storage device 20, an input device 30, a dual-tone multi-frequency (DTMF) decoder 40, a processor 50, and a screen 60. Depending on the embodiment, the electronic device 100 may be a mobile phone, a portable computer, a personal digital assistant, or any other electronic device having a number dialing function.

As shown in FIG. 1, the contact identification validation system 10 includes a setting module 11, a creation module 12, a prompt module 13, and a validation module 14. The modules 11-14 may include computerized code in the form of one or more programs that are stored in the storage device 20. The computerized code includes instructions to be executed by the processor 50 to provide functions of the modules 11-14 as illustrated in FIG. 2.

The storage device 20 also stores a phone book and a history list. The phone book stores one or more contact entries. Information in each of the entries may comprise a name, one or more phone numbers, and other kinds of information of a contact. The history list stores contact histories, such as call histories and short message histories, between each of the contacts and a user of the electronic device 100. The call histories comprise dialed calls, received call, and missed calls. The storage device 20 may be a cache or a dedicated memory, such as an EPROM, HDD, or flash memory. The input device 30 may be a keypad or a touch pad. The DTMF decoder decodes dialing signals sent from a telephone network during a call between a user of the electronic device 100 and a contact that makes the call, to determine digitals, symbols or letters input by the contact by pressing buttons on a keypad of the contact's communication device, such as a telephone.

Figure 2:
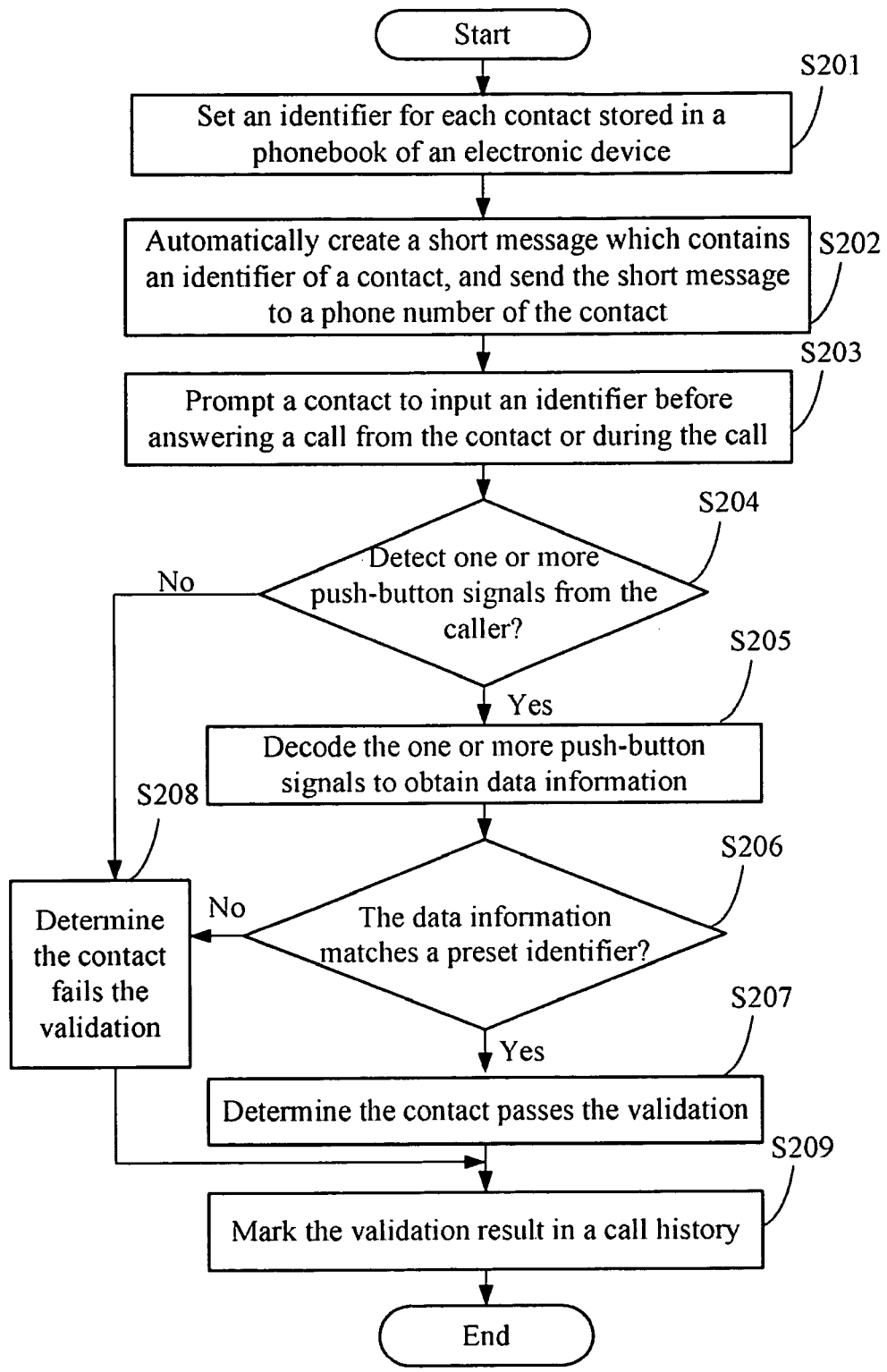
FIG. 2 is a flowchart of one embodiment of a method for validating contact identification.

FIG. 2 is a flowchart of one embodiment of a method for validating contact identification using the contact identification system 10 in the electronic device 100. Depending on the embodiment, additional blocks may be added, others removed, and the ordering of the blocks may be changed.

Figure 3:
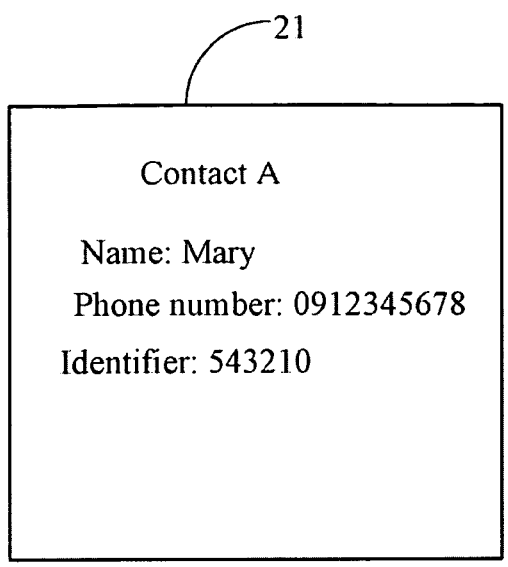
FIG. 3 is one embodiment that illustrates a contact entry stored in a phone book of the electronic device in FIG. 1.

In block S201, the setting module 11 sets an identifier for each contact stored in the phone book, and stores the identifier into a contact entry of the phone book. In one embodiment, the identifier may be a single number, a single symbol or a single letter, or a combination of numbers, symbols and letters, which may be input by a user of the electronic device 100 via the input device 30. For example, as shown in FIG. 3, the setting module 11 sets a set of digital numbers "543210" as the identifier of the contact "Mary" that has a phone number "0912345678".

In block S202, the creation module 12 automatically creates a short message which contains an identifier of a contact according to a preset message template (an example is shown in FIG. 4), and sends the short message to a phone number of the contact according to information stored in the contact entry of the contact, to inform the contact of the identifier. For example, the short massage sent to Mary may be "Hi, Mary! Your identifier is 543210 in my mobile phone, please note!"

In block S203, when receiving a call from a contact (known number of a contact stored in the phone book or a unknown number), the prompt module 13 prompts the contact to input an identifier, before answering the call or during the call (after the call has been answering by the user of the electronic device 100 and before the call is ended), by voice, such as "Please input your identifier!", or by other manner, such as a short message.

In block S204, the DTMF decoder 40 detects if one or more push-button signals have been received from the contact. If no push-button signal has been received from the contact, block S208 is implemented. In block S208, the validation module 14 determines that the contact fails validation, and the prompt module 13 may alert the user of the electronic device that the contact failed the validation by voice or a short message before answering the call or during the call, such as "Be careful! The contact failed the validation!". Otherwise, if one or more push-button signals have been received from the contact, block S205 is implemented. In block S205, the DTMF decoder 40 decodes the one or more push-button signals to determine data information, which may consist of digitals, symbols or letters input by the contact by pressing buttons on a DTMF keypad of the contact's communication device, such as a telephone or a mobile phone, for example.

As shown in FIG. 6, a DTMF keypad is laid out in a 4×4 matrix, with each row representing a low frequency, and each column representing a high frequency. Pressing a single key (such as "1") will send a sinusoidal tone for each of the two frequencies (697 and 1209 hertz). The sinusoidal tone is then decoded by the DTMF decoder 40 to determine which key was pressed.

In block S206, the validation module 14 determines if the data information matches an identifier of the contact that is stored in the phone book of the electronic device 100. If the data information does not match the identifier of the contact, block S208 described above is implemented. Otherwise, if the data information matches an identifier of a contact that is stored in the phone book, block S207 is implemented.

In block S207, the validation module 14 determines the contact passes the validation, and the prompt module 13 may alert the user of the electronic device that the contact passed the validation by voice or a short message before answering the call or during the call, such as "The contact passed the validation!".

Figure 5:
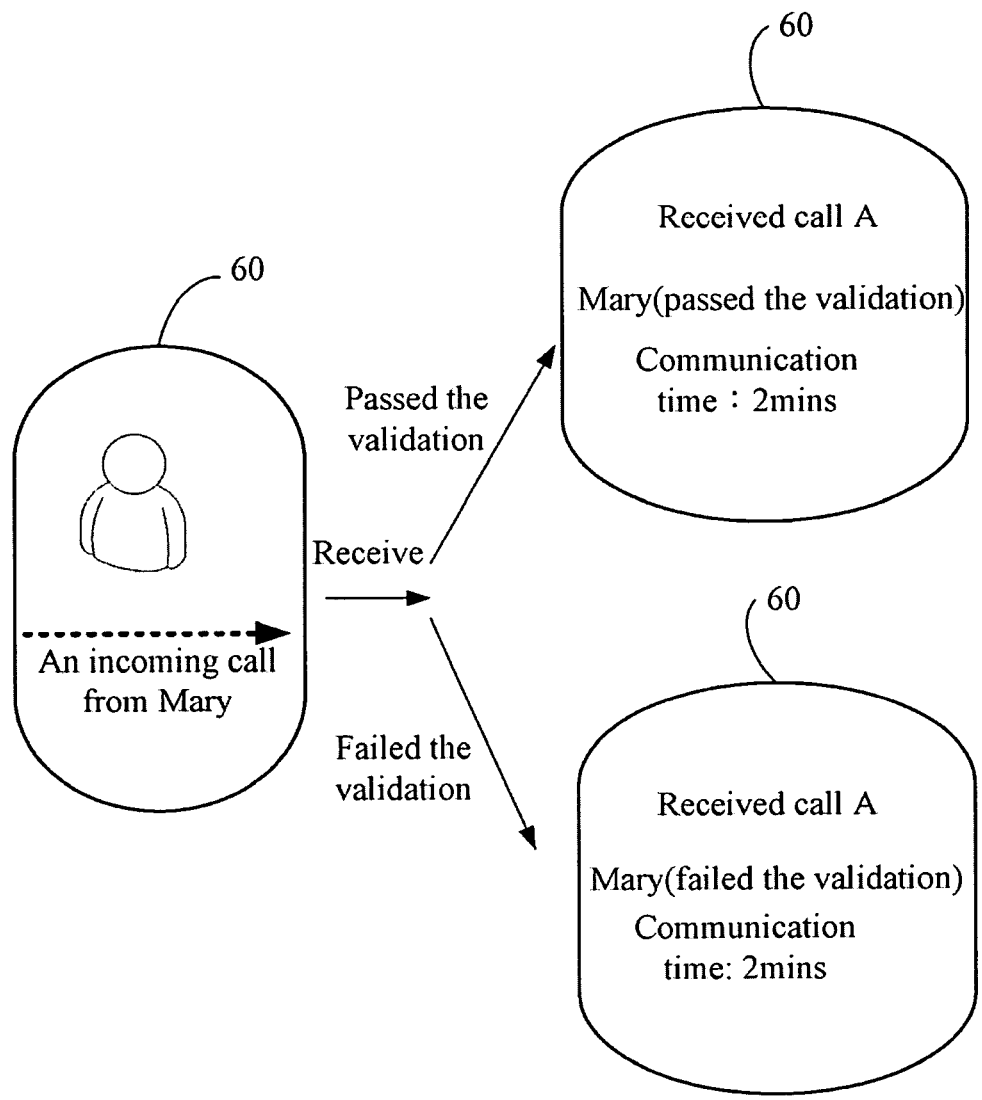
FIG. 5 is one embodiment that illustrates a validation result associated with a call history.

In block S209, the validation module 14 marks the validation result in the call history. As described above, the validation result includes passes the validation or failed the validation. For example, as shown in FIG. 5, if the electronic device 100 received an incoming call a showing the name and phone number of Mary, the electronic device 100 requests the contact to input identifier information during the call. If the contact does not input identifier information or input identifier information does not match Mary's identifier "543210" that is preset, the validation module 14 determines the contact fails the validation and marks "failed the validation" in the call history "received call A". Otherwise, if the input identifier is Mary's identifier "543210" that is preset, the validation module 14 determines the contact passes the validation, and marks "passed the validation" in the call history "received call A".

The present embodiments set and store identifiers for contacts stored in the electronic device 100, which may be used for help verifying identification of a caller, especially when the caller displays a name or a phone number of a family member or an organization (such as a bank) and requests confidential information or demands money from the user of the electronic device 100.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method being performed by execution of instructions by a processor of an electronic device for validating contact identification, the electronic device comprising a phone book that stores information of one or more contacts, the method comprising:

setting an identifier for each contact stored in the phone book, and storing the identifier into a corresponding contact entry of the phone book;

creating a short message which contains an identifier of a contact according to a preset message template, and sending the short message to a phone number of the contact to inform the contact of the identifier;

in response to receiving a call from a contact, prompting the contact to input an identifier before answering the call or during the call;

detecting if one or more push-button signals have been received from the contact by a dual-tone multi-frequency (DTMF) decoder;

determining the contact fails validation if no push-button signal has been received, or decoding the received one or more push-button signals by the DTMF decoder to determine data information input by the contact;

determining the contact fails the validation if the data information does not match an identifier of a contact that is stored in the phone book, or determining the contact passes the validation if the data information matches an identifier of a contact that is stored in the phone book; and marking the contact that failed the validation or passed the validation in a call history after the call is ended.

2. The method of claim 1, further comprising:

alerting a user of the electronic device that the contact failed the validation or passed the validation before answering the call or during the call.

3. The method of claim 1, wherein prompting the contact to input the identifier is by voice or by a short message.

4. The method of claim 1, wherein the identifier set for each contact is a single number, a single symbol or a single letter, or a combination of numbers, symbols and letters.

5. A non-transitory medium storing a set of instructions, the set of instructions capable of being executed by a processor of an electronic device to perform a method for validating contact identification, the electronic device comprising a phone book that stores information of one or more contacts, the method comprising:

setting an identifier for each contact stored in the phone book, and storing the identifier into a corresponding contact entry of the phone book;

creating a short message which contains an identifier of a contact according to a preset message template, and sending the short message to a phone number of the contact to inform the contact of the identifier;

in response to receiving a call from a contact, prompting the contact to input an identifier before answering the call or during the call;

detecting if one or more push-button signals have been received from the contact by a dual-tone multi-frequency (DTMF) decoder;

determining the contact fails validation if no push-button signal has been received, or decoding the received one or more push-button signals by the DTMF decoder to determine data information input by the contact;

determining the contact fails the validation if the data information does not match an identifier of a contact that is stored in the phone book, or determining the contact passes the validation if the data information matches an identifier of a contact that is stored in the phone book; and marking the contact that failed the validation or passed the validation in a call history after the call is ended.

6. The medium of claim 5, wherein the method further comprises:

alerting a user of the electronic device that the contact failed the validation or passed the validation before answering the call or during the call.

7. The medium of claim 5, wherein prompting the contact to input the identifier is by voice or by a short message.

8. The medium of claim 5, wherein the identifier set for each contact is a single number, a single symbol or a single letter, or a combination of numbers, symbols and letters.

9. An electronic device, comprising:
a storage device storing a phone book comprising information of one or more contacts;
a dual-tone multi-frequency (DTMF) decoder;
a processor; and
one or more programs stored in the storage device and being executable by the processor, the one or more programs comprising instructions to:
set an identifier for each contact stored in the phone book, and store the identifier into a corresponding contact entry of the phone book;
create a short message which contains an identifier of a contact according to a preset message template, and send the short message to a phone number of the contact to inform the contact of the identifier;
in response to receiving a call from a contact, prompt the contact to input an identifier before answering the call or during the call;
detect if one or more push-button signals have been received from the contact by a dual-tone multi-frequency (DTMF) decoder;
determine the contact fails validation if no push-button signal has been received, or decode the received one or more push-button signals by the DTMF decoder to determine data information input by the contact;
determine the contact fails the validation if the data information does not match an identifier of a contact that is stored in the phone book, or determine the contact passes the validation if the data information matches an identifier of a contact that is stored in the phone book; and
mark the contact that failed the validation or passed the validation in a call history after the call is ended.

10. The device of claim 9, wherein the one or more programs comprising instructions to: alert a user of the electronic device that the contact failed the validation or passed the validation before answering the call or during the call.

11. The device of claim 9, wherein prompting the contact to input the identifier is by voice or by a short message.

12. The device of claim 9, wherein the identifier set for each contact is a single number, a single symbol or a single letter, or a combination of numbers, symbols and letters.

* * * * *